Oct. 7, 1952     A. M. GUREWITSCH     2,613,302

HUMIDITY INDICATOR

Filed June 24, 1949

Inventor:
Anatole M. Gurewitsch,
by Richard E. Hosley
His Attorney

Patented Oct. 7, 1952

2,613,302

UNITED STATES PATENT OFFICE 2,613,302

HUMIDITY INDICATOR

Anatole M. Gurewitsch, Schenectady, N. Y., assignor to General Electric Company, a corporation of New York Application June 24, 1949, Serial No. 101,033

18 Claims. (Cl. 201—73)

This invention relates to an electrical resistance element and more particularly to an electrical response type relative humidity measuring element and a method for making same.

The present application is a continuation-in-part of prior application Serial No. 46,125 filed August 25, 1948, now abandoned, and assigned to the same assignee as the present application.

At the present time there are only three types of apparatus commonly employed for measuring relative humidity of air. They are the wet and dry bulb thermometers, the hair hygrometer, and apparatus for determining dew point. None of these devices is satisfactory, yet they have been in practically exclusive use for nearly a century, because no superior apparatus has been produced.

The wet and dry bulb thermometers are inconvenient to use, because they must be rapidly moved about in the atmosphere being measured. Furthermore, they are quite inaccurate at very high humidities and are entirely worthless for recording the lowest humidities.

The hair hygrometer type of apparatus is unsatisfactory, because the hair employed repeatedly contracts and extends until in a short time it loses its elasticity and its calibration changes.

The dew point apparatus, on account of its complexities, is principally a laboratory apparatus. It is not suitable for general use.

Attempts have been made to overcome the disadvantages of the older types of apparatus by means of electrical hygrometers. These devices generally comprise a resistor that absorbs or adsorbs moisture and thereby changes in electrical conductivity. Theoretically the resistor absorbs moisture or gives it up to the atmosphere, and thereby decreases or increases in resistance, as the relative humidity of the atmosphere increases or decreases. Therefore, it is expected that by measuring the resistance of the resistor the relative humidity of the atmosphere can be determined.

Such electrical devices have not heretofore solved the problem, because no satisfactory form of resistor has been available. The resistors heretofore employed have not been capable of quickly absorbing and giving up moisture directly in proportion to the moisture contained in the surrounding atmosphere, and/or have not been of a sturdy enough construction to withstand prolonged usage, and/or have deteriorated with use so as to require frequent replacement, and/or have not been practical for outdoor use.

Accordingly, it is a principal object of this invention to provide an electrical hygrometer or humidity indicator that has very rapid rate of response to humidity changes.

Another object of my invention is to provide an electrical hygrometer that can be easily made and is accurate in measuring humidity.

Another object of my invention is to provide an electrical hygrometer that is very resistant to wear and abrasion, is sturdy enough to withstand prolonged usage and does not deteriorate with use.

Further objects and advantages of my invention will become apparent as the following description proceeds, and the features of novelty which characterize my invention will be pointed out with particularity in the claims annexed to and forming a part of this specification.

In the drawing Fig. 1 shows an electrical resistance element having the elements embodying my invention as hereinabove described.

Fig. 2 is a cross-section view of the electrical resistance element taken on the line 2—2 shown in Fig. 1.

Figure 1:
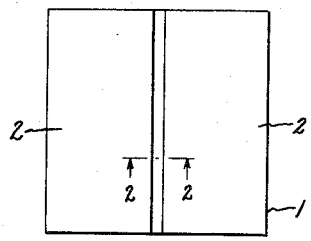
Figure 2:
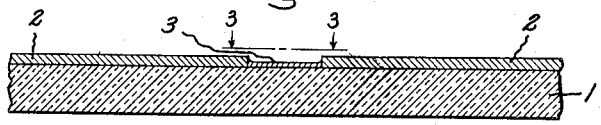
Fig. 2 shows in detail the electrical resistance element shown in Fig. 1.

Referring more particularly to Fig. 1 and Fig. 2 of the drawing, I have shown a glass plate 1 which has painted on to it a pair of parallel silver electrodes 2 which are separated by and contiguous to a thin layer, film or coating of conductive material 3.

Figure 3:
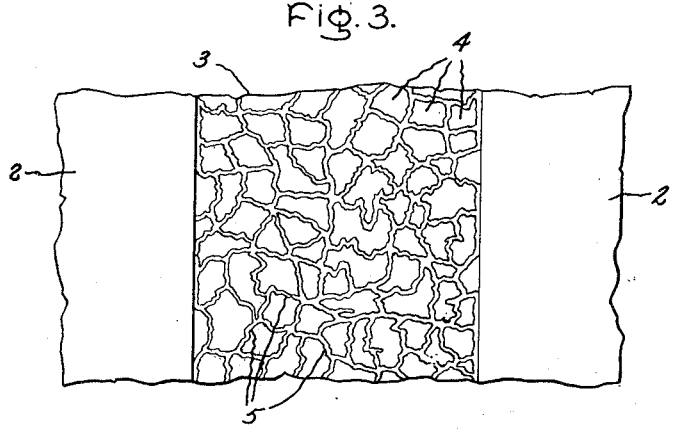
Fig. 3 is a greatly enlarged view of the surface of the electrical resistance element shown in Figs. 1 and 2, taken in the direction 3—3 as shown in Fig. 2.

Fig. 3 shows a greatly enlarged view of the strip of conductive film which has been subjected to a high frequency electrical discharge, showing in particular the irregular conductive islands and the relatively non-conductive channels crazing the film of conductive material which channels are formed by passing a high frequency electrical discharge through the film of conductive material. The islands of conductive material are noted as 4 and the relatively non-conductive channels 5 separate the conductive islands from each other.

Figure 4:
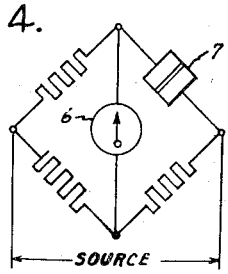
Fig. 4 shows a typical circuit for measuring the variation in electrical resistance with variation in humidity employing the resistance element herein described.

In Fig. 4 I have shown a Wheatstone bridge circuit comprising a source of power, an electrical current-indicating instrument 6 between the arms of the bridge and a resistance element 7 of the type shown in Figs. 1 to 3 in one of the arms of the bridge.

To make this electrical resistance element for a hygrometer, I take a glass, glazed ceramic or vitreous surface, heat it in a dry chamber to a temperature of about 400° C. to 700° C. and preferably to about 500° C., and then I introduce tin chloride vapor and preferably also some water vapor into the chamber. Alternatively a solution of tin chloride in a solvent such as alcohol may be sprayed on the hot vitreous surface. Depending on the concentration of the tin chloride in the alcohol, more or less of the solution must be used to obtain a suitable film on the surface. A solution containing fifty parts by weight each of tin chloride and alcohol is very conveniently used. Liquid tin chloride as such may also be used. After cooling and upon testing the glass or other vitreous surface, it is found to be electrically conductive.

The exact chemical composition of the film or thin layer formed on the heated glass or vitreous surface is not known. Analysis has shown that the film has no chlorine content. The tin, which is known to be present, is in combined form, perhaps as a tin oxide, or even conceivably in combination with the constituents of the vitreous surface. The absence of the usual gray cast of metallic tin militates against the presence of tin in this state.

It has been found that the conductive film thus formed is relatively non-sensitive to the humidity of the air surrounding the vitreous plate. It has also been found to be chemically stable and very highly resistant to physical abrasion.

Two strips of silver paint are painted onto the vitreous surface and then baked so that the silver will adhere to the surface. These silver strips are parallel to each other and are separated by a strip of the conductive film. These silver strips serve as electrical conductors one of which I attach to ground and to the other I connect a high frequency spark coil. In that way I impress a high frequency electrical discharge across the strip of conductive surface between the two silver electrodes. The high frequency discharge can be seen traveling across the strip of conductive surface in the form of a sparking front. It is not necessary that the entire strip of conductive surface be traversed by the high frequency discharge front. Under close examination it is found that this high frequency discharge breaks up the conductive surface into a myriad of little islands separated from each other by a network of channels. Thus, the islands remain conductors and the channels, where the conducting surface was destroyed, becomes relatively non-conductive. It is then found that the electrical resistance of this conductive strip has increased greatly, and the resistance is also found to be very responsive to the humidity of the atmosphere in which it is located, and is also found to be substantially instantaneously responsive to humidity fluctuation. Resistance ratios of the conductive element of better than 500 to 1 have been observed, corresponding to the variation between dry and humid air.

Experiments performed so far seem to indicate the following mechanism of operation: On a heated vitreous surface, treated with tin chloride, a thin conductive film is formed. The resistivity of this film is considerably lower than that of the vitreous surface. If such surface is exposed to an electrical discharge, the conductive film is broken up into conductive islands separated from each other by very narrow craze lines. As the water vapor pressure surrounding the device varies, or in other words as the relative humidity varies, more or less conductive "water bridges" are formed between the conductive islands, thus reducing the total resistance of the sample. If, for example, the atmosphere around the sample is saturated to 100% relative humidity, regardless of temperature, a thin water layer or film will form between the conductive islands. For less than 100% saturation, the water layers will be less extensive thus increasing the resistance. Thus, it is found that this device indicates relative humidity, rather than absolute humidity.

A typical sample hygrometer element consists of a glass plate 1 inch square by 1/8 inch thick. The size of the conductive strip is about 1/8 inch wide by 1 inch long, and the voltage impressed across this tin chloride-produced conductive strip is in the order of 10,000 to 20,000 volts. Elements have also been made using glass or vitreous surfaces covered with a film or coating of platinum and also of gold. The platinum or gold layer is broken up by an electrical discharge as described above. Elements so prepared show characteristics very similar to those prepared with tin chloride.

While only such materials as glass, glazed ceramics, and like vitreous materials which will withstand a temperature of about 500° C. may be used in producing a conductive surface using tin chloride, materials such as plastics, hard rubber and the like may be used in producing such conductive films with gold or platinum. In the latter cases gold or platinum paint may be painted on the surface to form a film or coating, subjected to a high frequency discharge as above to produce the conductive islands 4 described and silver or other conductive paint later used to produce parallel conductive surfaces 2.

It is felt that the fluctuation of resistance with humidity fluctuation is strictly a surface phenomenon, and the reason for this is that the conductive surface, itself, prior to being subjected to the high frequency discharge, is not responsive to variations of humidity. However, after being subjected to the high frequency discharge, it is responsive to humidity variations. This indicates that the water is not absorbed by the conductive surface but is adsorbed. A second indication is that a number of samples have been prepared in which the thickness of the conductive coating on the vitreous surface was not controlled. Despite this there was no lag in response to the system due to the relative inertia of the different thicknesses of conductive film nor was there any variation in the sensitivity of the indicator. Thus, the action of the conductive layer and the water vapor seems to be strictly a surface phenomenon.

Although either an A.-C. or D.-C. source of power may be used in the circuit shown in Fig. 4 for measurement of humidity effects, it is pointed out that use of an A.-C. source will avoid any possible polarization effects.

While I have shown a particular embodiment of my invention, it will be understood, of course, that I do not wish to be limited thereto since many modifications may be made, and I, therefore, contemplate by the appended claims to cover any modifications as fall within the true spirit and scope of my invention.

What I claim as new and desire to secure by Letters Patent of the United States is:

1. A method for making an electrical resistance element comprising the steps of forming an electrically conductive surface film on a dielectric, and then breaking up the electrically conductive film into a plurality of electrically conductive elements separated from each other by a network of relatively non-conductive channels.

2. A method for making an electrical resistance element comprising the steps of forming an electrically conductive surface film on a dielectric, and then subjecting the conductive film to a high frequency electrical discharge so as to cause the electrically conductive film to be broken up into a plurality of electrically conductive islands separated from each other by a network of relatively non-conductive channels.

3. A method for making an electrical resistance element comprising the steps of treating a dielectric with a conductive material to form an electrically conductive surface film on said dielectric, and then subjecting the electrically conductive film to a high frequency electrical discharge so as to cause the electrically conductive film to be broken up into a plurality of electrically conductive islands separated from each other by a network of relatively non-conductive channels.

4. A method for making an electrical resistance element comprising the steps of coating a dielectric with an electrically conductive film comprising platinum and then subjecting the conductive film to a high frequency electrical discharge so as to cause the electrically conductive film to be broken up into a plurality of electrically conductive islands separated from each other by a network of relatively non-conductive channels.

5. A method for making an electrical resistance element comprising the steps of coating a dielectric with an electrically conducting film comprising gold and then subjecting the conductive film to a high frequency electrical discharge so as to cause the electrically conductive film to be broken up into a plurality of electrically conductive islands separated from each other by a network of relatively non-conductive channels.

6. An electrical resistance element comprising a dielectric having an electrically conductive surface film thereon, said conductive film comprising a plurality of electrically conductive islands separated from each other by a network of fine, relatively non-conductive channels.

7. A method for making an electrical resistance element comprising the steps of coating a dielectric with an electrically conductive film produced by treating the heated dielectric with tin chloride and then subjecting the conductive film to a high frequency electrical discharge so as to cause the electrically conductive film to be broken up into a plurality of electrically conductive islands separated from each other by a network of relatively non-conductive channels.

8. A method for making a humidity indicator element comprising the steps of coating a dielectric with an electrically conductive film and then subjecting the conductive film to a high frequency electrical discharge so as to cause the electrically conductive film to be broken up into a plurality of electrically conductive islands separated from each other by a network of relatively non-conductive channels.

9. A method for making a humidity indicator element comprising the steps of forming an electrically conductive surface film on a dielectric, attaching electrodes to said conductive film and then subjecting the conductive film contiguous to and separating said electrodes to a high frequency electrical discharge so as to cause the electrically conductive film to be broken up into a plurality of electrically conductive islands separated from each other by a network of relatively non-conductive channels.

10. A method for making a humidity indicator element comprising the steps of treating a piece of heated vitreous material with tin chloride vapor, and then subjecting the conductive film formed on the surface of said glass to a high frequency electrical discharge to break up said conductive film into a plurality of electrically conductive islands separated from each other by a network of relatively non-conductive channels.

11. A method of making a humidity indicator element comprising the steps of treating a piece of heated vitreous material with tin chloride vapor and water vapor to form a conductive surface film on said glass, painting electrodes on the conductive surface of said element, and then subjecting the conductive film contiguous to and separating the electrodes to a high frequency electrical discharge so as to cause the electrically conductive film to be broken up into a plurality of electrically conductive islands separated from each other by a network of relatively non-conductive channels.

12. A method of making a humidity indicator element comprising the steps of treating a piece of glass heated to about 400° C. to 700° C. with tin chloride vapor to form a conductive surface film on said piece, painting electrodes on the conductive surface of said element, baking the entire element, and then subjecting the conductive film contiguous to and separating the electrodes to a high frequency electrical discharge of the order of 10,000 to 20,000 volts so as to cause the electrically conductive film to be broken up into a plurality of electrically conductive islands separated from each other by a network of relatively non-conductive channels.

13. A method of making a humidity indicator element comprising the steps of treating a piece of vitreous material heated to about 400° C. to 700° C. with tin chloride vapor and water vapor to form a conductive surface film on said piece, painting electrodes on the conductive surface of said element, baking the entire element, and then subjecting the conductive film contiguous to and separating the electrodes to a high frequency electrical discharge of the order of 10,000 to 20,000 volts so as to cause the electrically conductive film to be broken up into a plurality of electrically conductive islands separated from each other by a network of relatively non-conductive channels.

14. A method for making a humidity indicator element comprising the steps of treating a heated dielectric material with tin chloride to form an electrically conductive film thereon and then subjecting the conductive film to a high frequency electrical discharge so as to cause the electrically conductive film to be broken up into a plurality of electrically conductive islands separated from each other by a network of relatively non-conductive channels.

15. A humidity indicator element comprising a dielectric having an electrically conductive surface film thereon, said conductive film comprising a plurality of electrically conductive islands separated from each other by a network of fine, relatively non-conductive channels.

16. A humidity indicator element comprising a dielectric body, a pair of conductors attached to the surface of said dielectric body and separated by and contiguous to a film on the surface of said dielectric body produced by the action of tin chloride vapor on the heated surface, said film comprising a plurality of electrically conductive islands separated from each other by a network of fine relatively non-conductive channels.

17. A humidity indicator element comprising a dielectric body, a pair of conductors attached to the surface of said dielectric body and separated by and contiguous to a film of platinum on the surface of said dielectric body, said film comprising a plurality of islands of platinum separated from each other by a network of fine relatively non-conductive channels.

18. A humidity indicator element comprising a dielectric body, a pair of conductors attached to the surface of said dielectric body and separated by and contiguous to a film of gold on the surface of said dielectric body, said film comprising a plurality of islands of gold separated from each other by a network of fine relatively non-conductive channels.

ANATOLE M. GUREWITSCH.

REFERENCES CITED

The following references are of record in the file of this patent:

UNITED STATES PATENTS

| Number | Name | Date |
|---|---|---|
| 1,023,917 | Bennett | Apr. 23, 1912 |
| 2,005,922 | Stoekle | June 25, 1935 |
| 2,021,661 | Kisfaludy | Nov. 19, 1935 |
| 2,321,587 | Davie et al. | June 15, 1943 |
| 2,429,420 | McMasters | Oct. 21, 1947 |

FOREIGN PATENTS

| Number | Country | Date |
|---|---|---|
| 352,903 | Great Britain | Oct. 29, 1930 |